United States Patent [19]

Reber et al.

[11] Patent Number: 6,061,758
[45] Date of Patent: May 9, 2000

[54] SYSTEM AND METHOD FOR MANAGING STORAGE AND RETRIEVAL OF MEDIA DATA INCLUDING DYNAMIC LINKAGE OF MEDIA DATA FILES TO CLIPS OF THE MEDIA DATA

[75] Inventors: Stephen J. Reber, Brookline, N.H.; Eric C. Peters, Carlisle, Mass.

[73] Assignee: Avid Technology, Inc., Tewsbury, Mass.

[21] Appl. No.: 08/802,197

[22] Filed: Feb. 14, 1997

Related U.S. Application Data

[63] Continuation of application No. 08/742,431, Oct. 30, 1996, abandoned, which is a continuation of application No. 08/159,332, Nov. 29, 1993, Pat. No. 5,584,006, which is a continuation of application No. 07/455,568, Dec. 22, 1989, Pat. No. 5,267,351.

[51] Int. Cl.[7] .................................................. G06F 12/06
[52] U.S. Cl. .............................. 711/100; 360/13; 369/83; 707/104
[58] Field of Search .................................. 707/1, 2, 104; 345/328; 386/52, 54; 711/100; 360/13; 369/83

[56] References Cited

U.S. PATENT DOCUMENTS

| | | | |
|---|---|---|---|
| 4,538,188 | 8/1985 | Barker et al. | 386/54 |
| 4,635,136 | 1/1987 | Clampa et al. | 386/64 |
| 4,641,203 | 2/1987 | Miller | 386/95 |
| 4,729,044 | 3/1988 | Kiesel | 386/55 |
| 4,746,994 | 5/1988 | Ettlinger | 360/13 |

(List continued on next page.)

FOREIGN PATENT DOCUMENTS

| | | |
|---|---|---|
| 0240794 | 10/1987 | European Pat. Off. |
| 0268270 | 5/1988 | European Pat. Off. |
| 0 273 435 A3 | 7/1988 | European Pat. Off. |

(List continued on next page.)

OTHER PUBLICATIONS

R. Hutchinson et al., "Media Management and Control of Video Disks, " Int'l Broadcasting Convention Sep. 1995, Conference Publication No. 413, © IEE 1995, pp. 310–315.

Arthur Schneider, "Edit List Management," SMPTE Journal, vol. 88, pp. 538–542, Aug. 1979.

(List continued on next page.)

*Primary Examiner*—Paul V. Kulik
*Attorney, Agent, or Firm*—Wolf, Greenfield & Sacks, P.C.

[57] ABSTRACT

A system for the management of media data and binding of media date to requests for pieces of media, which includes a plurality of procedures that can establish and write storage of new media, and make requests for media based on media source identification and range on the specified media source. A system for the management of relational information between media sources, which includes a plurality of procedures to set and query the information. Relations are established either via interaction with the sources or by user's specifications. Relations are based on positions in the source, labels on these positions and ranges from the labels indicating the length of the relation. Further the invention provides for the separation of information concerning source relations, actual media stored for these sources, and binding of media to specific needs for the media within the system. Moreover the invention involves a method of determining media data associated with requests based on source identifiers and range specification on said source comprising: reading media data from disk and building a database of the location of said media, allowing for the creation of other media, using the system of relational information to build a table of source relations, accepting requests for media data, locating the media based on known existing media and queries for other sources related to the range requested, returning an identifier known to the system to the requester, and accepting requests for information about and access to the actual media data specified by the identifier.

42 Claims, 2 Drawing Sheets

Microfiche Appendix Included
(1 Microfiche, 72 Pages)

U.S. PATENT DOCUMENTS

| | | | |
|---|---|---|---|
| 4,750,050 | 6/1988 | Belmares-Sarabia | 386/4 |
| 4,754,342 | 6/1988 | Duffy | 386/55 |
| 4,914,527 | 4/1990 | Asai et al. | 386/75 |
| 4,918,588 | 4/1990 | Barrett et al. | 707/10 |
| 4,931,950 | 6/1990 | Isle et al. | 706/11 |
| 4,937,685 | 6/1990 | Barker et al. | 386/52 |
| 4,954,969 | 9/1990 | Tsumura | 345/327 |
| 4,979,050 | 12/1990 | Westland et al. | 386/52 |
| 4,989,191 | 1/1991 | Kvo | 369/33 |
| 4,996,664 | 2/1991 | Fujiwara et al. | 345/508 |
| 5,099,337 | 3/1992 | Cury | 386/54 |
| 5,101,364 | 3/1992 | Davenport et al. | 345/328 |
| 5,109,482 | 4/1992 | Bohrman | 345/328 |
| 5,111,409 | 5/1992 | Gasper et al. | 345/302 |
| 5,267,351 | 11/1993 | Reber et al. | 707/104 |
| 5,584,006 | 12/1996 | Reber et al. | 711/100 |
| 5,668,639 | 9/1997 | Martin | 385/52 |
| 5,732,184 | 3/1998 | Chao et al. | 386/55 |
| 5,754,851 | 5/1998 | Wissner | 345/302 |
| 5,760,767 | 6/1998 | Shore et al. | 345/328 |

FOREIGN PATENT DOCUMENTS

| | | |
|---|---|---|
| 0390048 | 10/1990 | European Pat. Off. . |
| 0403118 | 12/1990 | European Pat. Off. . |
| 0424903 | 5/1991 | European Pat. Off. . |
| 0469850 | 2/1992 | European Pat. Off. . |
| 0526064 | 2/1993 | European Pat. Off. . |
| 0 113 993 A2 | 7/1994 | European Pat. Off. . |

OTHER PUBLICATIONS

Wendy E. Mackay et al., "Virtual Video Editing in Interactive Multimedia Applications," Communications of the ACM, vol. 32 No. 7, Jul. 1989, pp. 802–810.

E.A. Fox et al., "Virtual Video Editing in Interactive Multimedia Applications," Communications of the ACM, vol. 32 No. 7, Jul. 1989, pp. 802–810.

Frank Davidoff, "The All—Digital Television Studio," SMPTE Journal, vol. 89, No. 6, Jun. 1980, pp. 445–449.

SMPTE Journal, vol. 99, No. 8, Aug. 1990, Scarsdale, NY US, pp. 634–638, XP142532.

L.J. Gardner et al., "A Closed–Loop Digital Video Editing System," pp. 634–638, 131st SMPTE Technical Conference in Los Angeles (paper No. 131–94), Oct. 23, 1989.

Translation of Japanse Patent Application Public–Disclosure No. 1–233489, Ogawa et al. Oct. 19, 1989.

SYSTEM AND METHOD FOR MANAGING STORAGE AND RETRIEVAL OF MEDIA DATA INCLUDING DYNAMIC LINKAGE OF MEDIA DATA FILES TO CLIPS OF THE MEDIA DATA

CROSS-REFERENCE TO RELATED APPLICATION

This application is a continuation of application Ser. No. 08/742,431, filed Oct. 30, 1996, now abandoned which is a continuation of application Ser. No. 08/159,332, filed Nov. 29, 1993, now U.S. Pat. No. 5,581,006 which is a continuation of application Ser. No. 07/455,568, filed Dec. 22, 1989 and now U.S. Pat. No. 5,267,351.

MICROFICHE APPENDIX

This application contains a Microfiche Appendix pursuant to 37 C.F.R. 1.96(b) containing one (1) microfiche card with seventy-two (72) frames. The Microfiche Appendix hereby is incorporated herein by reference in its entirety.

Copyright Notice

Portions of the disclosure of this patent document, in particular, portions of the Microfiche Appendix, contain material that is subject to copyright protection. The copyright owner has no objection to the facsimile reproduction by anyone of the patent document or the patent disclosure, as it appears in the U.S. Patent and Trademark Office, patent file or records, but otherwise reserves all copyright rights whatsoever.

BACKGROUND OF THE INVENTION

The invention relates to non-linear editing systems and the storage and retrieval of the media associated with the system, i.e., video and audio data.

Non-linear editing on computer oriented systems involves digitizing media data recorded from a linear source, e.g., a video tape cassette, and storing the digitized media data on a storage device, e.g., a hard disk drive. Once digitized, the media data can be accessed quickly at any point in the linear sequence in which it was recorded so that various portions of the data can be accessed and edited in a non-linear way.

Editing in either a linear or non-linear system involves a similar principle. Source material from some source (video tape, audio recording, film etc.) is broken down into a series of separate "clips" representing the material desired for the final master, and then reassembling these "clips" into a final sequence achieving the desire of the editor and producer. "Clips" can be either video or audio materials or both (synchronous audio and video). In a non-linear system the typical approach involved allotting to each clip an associated digitized section of the original source in storage on the system in a "media file." The system would allow the user to manipulate the clips in order to produce the final sequence. The clips referred to the media files when certain specific information about the source media was needed, such as the original source name or nature of the media (video or audio), or when the need arose to actually view or hear (i.e., play) the media associated with the clip.

For example, a user editing on a non-linear system had the ability to manipulate clips into any order, use audio clips with other video clips, and create new clips by using smaller pieces of other clips. Tools existed to allow the user to combine clips of similar material for other effects. Video clips were used in combination to create dissolve effects, and audio clips to create various audio effects.

Typically, the output of an edit, i.e., an editing procedure such as the one described above, is an "Edit Decision List" (EDL) which can be used either by a conventional on-line editing system such as the CMX300 or a non-linear system to create or assemble a new linear sequence from other existing linear source material, e.g., video tape. The EDL is used to direct the on-line system to locate or "cue" the first frame of a desired clip which is recorded on a source video tape and loaded into a video tape recorder (VTR). The editing system then records the cued clip onto a target or destination medium, e.g., video tape, and cues the first frame of the next desired clip. (Note that the next desired clip may be recorded on the same or a different physical source medium as the first clip). Once cued, the editing system records the next desired clip onto the target medium. This process is repeated until the EDL is exhausted and the target medium represents the selected original material reorganized into the sequence described by the EDL.

The standard or conventional method when establishing a system of media archival is as follows: As each clip of source material is captured for storage in the system, the information about the clip and its actual digitized data is either coresident or linked directly at the time of the capture. Whenever the clip is referenced by the user of the system, the media associated with it is always the same particular one that was associated with it at the time of the capture (whether the media was digitized or actually was still intact on the original source). Any manipulation or editing concerning the clip or segment would directly use the media data tied to it for viewing or playback. Any information about the source that it came from or equivalent sources would need to be stored with each clip or segment. As such, the whole collection of clips or segments would be needed at any time in order to determine the breadth of any source relationships. And as new source relationships were developed it would be difficult if not impossible to inform all clips or segments of the new information. Additionally, tying the media data directly to a clip or segment would make it necessary to duplicate media data if certain clips or segments overlapped or were contained entirely within one another.

The invention solves these and other difficulties and problems.

SUMMARY OF THE INVENTION

The invention involves dynamically linking or binding a digitized representation of the media with a specific reference to the media at the time the information is needed at run time and being able to change the binding as certain facets in the system change. To that end the invention is a system for determining the media needed at the time a clip is requested to be played, viewed or information retrieved concerning the media associated with the clip. Specifically, each clip is dynamically connected to the specific media at the time that it needs access to the media associated with it.

The invention also involves the separation of information concerning the specifics of a piece of digitized media, information specific about the source material the media was derived from, and information concerning the connection of media data to those requesting or needing access to it. Specifically, the three groups of information that are distinctly separate from each other are:

(1) the information concerning physical source mediums may indicate which sets (or subsets) of physical source material are equivalent, or make correlations in the labeling of certain segments of the source material (example: film edge numbers equivalenced (i.e., correlated with time code);

(2) the information about the specific digitized media as to the type of media, the length of the data, the range on the source the media represents and the locations of such media resources; and (3) the information concerning the binding of the media data to the requesters of media. Included in the invention is the concept that the binding of media resources to those in need of the media is not made until the request for the media is made, and the fulfillment of the request may change depending on the media available at the time of the request.

The invention also involves the method of storage and retrieval of the necessary source relational information from one invocation of the application to the next, such that it is coresident with the clips and/or media that it is specific for. This makes knowledge of the form of information storage-imperceptible to the user of the system.

Advantages of such a system are described below:

Media need only be digitized once. Clips referring in part or in whole to the same media result in references to the same physical data in the system. Duplicate copies of the media are not needed or created.

Deletion and recapturing of segments of the original source results in all clips referring to the specific new source material entered into the system.

Clips requesting media from one physical source may receive media from a distinctly different physical source if the sources have been identified as equivalent.

Actual location of the media in storage is free to move to any location on disk, without notification necessary to clips requiring reference to the media.

DESCRIPTION OF THE PREFERRED EMBODIMENTS

Figure 1:
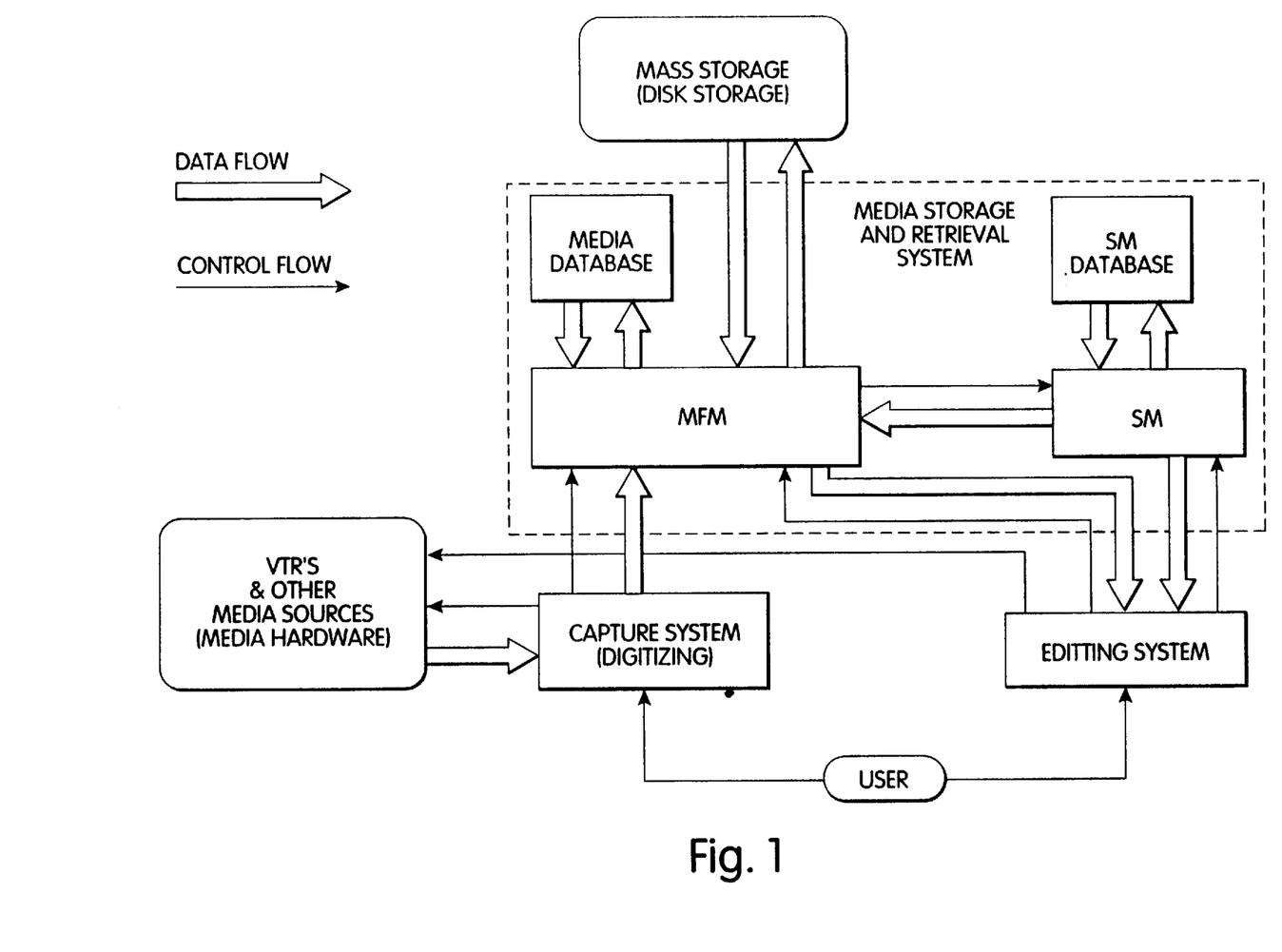
FIG. 1 is a block diagram showing one embodiment of control and media data flow among the media file manager, the source manager, media storage, and media capture and editing facilities.

FIG. 1 is a block diagram illustrating the overall functional relationships of the media storage and retrieval system according to the invention, with media hardware, disk storage and the user interface.

As shown in FIG. 1, media sources such as VTRs containing linear media data are controlled via editing and capture systems under the user's control. Digitized media data from the capture system is transferred and stored on a mass storage volume such as a hard disk drive as digitized media files and selectively retrieved under the control of a media storage and retrieval system which is the subject of the present application. The media storage and retrieval system is implemented preferably as a software application having two distinct components: the media file manager (MFM) and the source manager (SM) along with their respective databases, namely, the media database and the SM database. A user accesses and operates on the digitized media files via calls placed by the editing system to the MFM which both creates and manages the media files. The MFM also interacts with the SM which inter alia maintains a table of relations between the linear media data, recorded, for example, on source tapes, and the digitized media files. MFM exists in modular software form and consists of a procedural interface that accepts requests for specific pieces of media from specific source material. SM exists in modular form and consists of a procedural interface that accepts requests for source material relational information, and requests to read or write source relational and specific information to an area of storage.

The source code appendix provides specific code for implementing both MFM and SM. The system makes use of two other procedural subsystems: one being a linked data list manager, and the other being a sectional file writing and reading manager. These subsystems are conventional utilities sometimes offered as "toolboxes".

Linked data list management involves the functions of linking together records of information in some order. Other procedural interactions with this tool make it possible to sort the records in a variety of orders depending on certain key fields in the records. The list manager is also able to "sift" certain records from the entire pool of records based on requested values of key fields in the records.

Sectional file writing utility provides the ability for multiple clients to write data to the same file and retrieve it without knowledge of either the format of the file or the identity of other clients using the file.

Media File Manager

Media File Manager (MFM) is responsible for the management of all media that is present at any time and available to the system for use. This media may be media recorded earlier and stored in some medium, or available on demand via some link to mechanical devices. The media may be duplicately represented in a variety of resolutions or qualities. MFM's purpose is to locate media (or information pertaining thereto) specified by a user request consisting of a range of time from some specific source. The range in time may be specified by the now common SMPTE time code, film edge numbers, real time or some other standard of range identification of source material. The request does consist of a specific source from which the media is desired. This specific source request is unique and the system works on the concept that identifiers exist that separately identify any source medium.

At any time after the system is initialized the MFM has an internal abbreviation (i.e., a log or set of records) of all the media that is known to be accessible to it, and where and how that material may be retrieved. The internal abbreviation is contained in the media database built by the MFM. When a client of the MFM requests information or access to actual media, MFM uses its internal abbreviation of the media available to determine a media source that will serve as a satisfactory response to the client's request. A MFM identifier is returned to the client. In any other requests for the specific media the client may use the identifier for quick access to the material. This identifier represents the dynamic link or binding of a client's need for media and the actual source of media to be used. This identifier remains constant to the client, and any media deletions, changes or additions are changed internally by the MFM, i.e., transparently to the user, and have corresponding effects on any identifiers already released. As described in the procedural interface, two different types of identifiers can be released by the MFM. For the sake of differentiation, one type is designated a MFM_CRUX and the other a MFM_GIST, the main difference between these being a level of privilege available to the client holding one and/or the other. The holder of a MFM_CRUX is able to make any number of procedural calls to MFM requesting information about the media, but the privilege to read or write the actual media is withheld. Using a MFM_CRUX, the client can call a routine mfm_open which will give the client a MFM_GIST identifier. This identifier is accepted by mfm_read and mfm_close to be able to read the actual media from the file. The reason for this is to give the MFM some control over which physical connections to actual media are opened or closed. On some systems this is desired as the number of channels to existing media may be limited, and MFM needs a method of managing access.

Media File Procedural Interface

The media file manager (MFM) is a procedural interface between a media requester and the media files themselves. The interface consists of a set of software modules which are described below.

Mfm$_{13}$ init

Mfm_init is called at the time the application is invoked. It is a one-time operation. Its basic functionality is to initialize the linked list data structures that will be needed and determine all media available on the system at the current time. Functionally it scans all the disk drives on the system and determines if the short-hand version of the media file database which it has previously placed on the drive is valid. This is determined by comparing the time stamp on the file with the time stamp on the directory in which it was stored. If they are equal (they are made equal when the database was written) then the database is valid and MFM proceeds to read in the information pertaining to it into RAM using the sectional file routines and then passes the file to the SM (sm_readNtable) so that it can read in the SM information stored there. Of course, the file itself is not transferred; only its address in memory. If it is invalid then the file is passed to the SM for processing the SM information contained in it (see mfm_quit), and then all media files on the volume are scanned individually. In the reading of the media databases and the scanning of the other drives the run time media database (FIG. 1) is initialized with its original media.

Mfm_handle

Mfm_handle is the call a client, e.g., the user interface (FIG. 1), uses to receive an identifier (MFM_CRUX) giving inquiry rights on the media and for determining a binding between the request and an actual media source. The request is comprised of a source unique identifier or "id", a range on the source, type of media (video or audio,) and the physical channel requested if any that the source media was recorded from (for instance the type of media may be audio, and the physical channel may be two, indicating audio2 media). To handle the request MFM sifts through its existing linked list of records based on the values of the request. (This is actually done with search support procedures within the linked list utility.) If a match is found then the handle to that record is returned in the form of a MFM_CRUX. If no media is found, then MFM calls SM_relate to determine if any other source material has equivalent material contained in it, equal to that being requested by the client. If so, MFM then again sifts its database, looking for the appropriate media on these other sources. If any is found a MFM_CRUX handle is returned to the client. If no media is obtained via any of these methods, mfm_handle returns a MFM_CRUX for BLACK or SILENCE depending on the media type originally requested, and flags an error message that no media as requested was available.

Mfm_open

Mfm_open is called by the client when it will be necessary to actually obtain media data from the media source. Mfm_open accepts a MFM_CRUX identifier, which the client/requester must have already obtained, and proceeds to establish a connection with the media source (open the file). Once the connection is established the client is given a MFM_GIST identifier. This identifier can be used with mfm_read calls to obtain the actual raw media data.

Mfm_read

Mfm_read is the procedural interface used to pass actual media data from the media source into a buffer specified by the caller. The parameters to the call are designed such that the caller asks for a frame of information using a range identifier to identify the frame offset from zero of the range scale. For example in the time code ranging method, the caller asks for the absolute time code of the frame desired. The call analyzes the type of media being requested, the size of the buffer the caller has provided and the number of frames the caller has requested. Based on this information a best fit is made for the caller's buffer and the actual number of frames passed to the buffer is returned.

Mfm_close

Mfm_close is used to allow MFM to close the channel to the media source. The call accepts a MFM_GIST identifier and from this identifier MFM is able to distinguish if the media channel is open for write (a previous mfm_create call), or open for read (a previous mfm_open call).

If the media channel is open for write, the call examines a parameter which indicates caller specific information about the nature of the write to the channel. Length, range identifier, media identifier and data rate over time are all specified. MFM includes this information in the media channel in a header and then closes the channel. This media channel (source) is now available in the MFM database as a possible candidate for fulfilling a mfm_handle request.

If on the other hand the channel was open for read (via a previous mfm_open) the channel is simply noted as being closed for that particular client, and if no other clients are using the channel then the channel is closed.

Regardless of the type of closure, the MFM_GIST identifier passed in is no longer valid, and a MFM_CRUX identifier is passed back to the caller. This identifier would be used in further calls to mfm_open if the client again desired an open channel to the media data.

The call mfm_close also makes decisions on the type of channel being created. Two types are possible, temporary and disk resident. A temporary media channel exists in memory only for the duration of the application run, disk resident files are placed on disk and will be available at the time of the next application invocation. For example, an experimental dissolve effect on two other video media channels might become a temporary file, while actual video from an external source might be captured, digitized and stored in a disk resident file.

Mfm_create

Mfm_create is the procedural interface used by the client who wishes to permanently store media data on file with the MFM. The call grants the caller a MFM_GIST identifier allowing calls to mfm_write to actually write the media data to a open channel. At the time of the call MFM checks its available space for recording of such information and sets up to receive media data into such space. Specifically mfm_create creates files on disk and pre-allocates their size as large as possible. The initial header on the file is created and it is cast a media channel in the stage of creation. In this way it can be identified later if the caller fails to write data to the channel, or fails to close the channel (via mfm_close.)

Mfm_write

Mfm_write is the procedural interface used by the caller to actually transfer media data obtained from source into a media channel of the MFM. It is in this way that MFM is able to store media data for use later as a media source in response to mfm_handle requests.

Specifically the call takes in a pointer to a buffer containing the data and a length on this particular buffer. The data is copied from the buffer for the specified length into the media channel identified by the MFM_GIST identifier handled in via a previous call to mfm_create. The buffer information is simply copied onto the end of any data already written to the channel. The channel may be a temporary channel (main memory) or a disk resident channel (disk file). The two types of records are structured according to the following formats.

Runtime MFM record structure

One of these is present in memory at runtime for each known media file out on disk.

See C typedef for MFM_Crux_t in mfm_pvt.h

Channel identifier

This is the physical channel associated with the media type from the physical source. Ie: Two tracks of audio from the same source would be differentiated by different channel identifiers.

File_use

An internal identifier indicating whether the media file is open for access and if so the nature of the open, read or write.

Media Type

This is an internal identifier indication what type of media data is stored in the file. Ie: video or audio or some other.

File Type

This is an internal identifier as to the format of the media stored in the file.

Volume ID

Dir DID

Filename

These three fields together indicate the exact position on disk such that the file can be opened, read, written or closed.

UID

This is the unique source medium identifier. This is the uid that the SM tracks and manages in its database.

Start_time

This is the range identifier for the position in the source that the beginning of the media data in this file corresponds to.

End_time

End range identifier.

Media_specific

This is a optional area for storage of specific information for this particular type of media.

Diskfile MFM header

One of these is present on disk at the beginning of each media file.

See C typedef for mfm_base_t in mfm_pvt.h

Channel identifier

This is the physical channel associated with the media type from the physical source. Ie: Two tracks of audio from he same source would be differentiated by different channel identifiers.

Media Type

This is an internal identifier indication what type of media data is stored in the file. Ie: video or audio or some other.

File Type

This is an internal identifier as to the format of the media stored in the file.

Name

This is a copy of the character name the user specified as the source of the media data in the file.

UID

This is the unique source medium identifier. This is the uid that the SM tracks and manages in its database.

Start_time

This is the range identifier for the position in the source that the beginning of the media data in this file corresponds to.

End_time

End range identifier.

Media_specific

This is a optional area for storage of specific information for this particular type of media.

Mfm_quit

Mfm_quit is the procedural interface used by the application when the application is quitting. It provides MFM with the opportunity to clean up and write any information necessary out to permanent storage before quitting.

Specifically, the list of current media channels known to exist is sorted and sifted based on the areas in which the channels exist. All the records in the list for those channels existing on a single hard disk are grouped together and written to disk as a single file. This write of information is done using the sectional file write utilities. Once the database is written to disk in this abbreviated form, the file handle is passed to SM (sm_closeNwrite) so that SM information pertinent to the media channels on this disk can also be recorded in the file. MFM is unaware of the format or specifics of the SM information. Once this is done for all existing disk drives, MFM releases any remaining storage used for its run time databases or lists. Control is returned to the caller (the application).

Source Manager

Source Manager(SM) is responsible for the management of all information specific to the physical attributes of the source mediums. Each source medium is assigned a numerically unique identifier (UID) upon initial exposure to the system. To ensure a unique identification, the UID is a random number such as a combination of the seconds since Jan. 1, 1904 and the number of seconds since the system was started. The user specified name of the source is coupled with this unique identifier. This name/unique id pair is the minimum information entered as a record in the Source Manager.

At its most primitive functional level the SM manages the list of source medium-names being used or referred to internally in the system at any point in time.

As an additional function the SM is responsible for maintaining the relational connections of source mediums. For example: if two video tapes have been identified with different names, but actually contain the same source video (albeit possibly different time code labelling), the SM is charged with cataloging this information once the user has made the information available. In a more specific and restrictive example it may be the case that only some portion of some source material is equivalent to some other portion of some other source material. This also the SM is responsible for storing and managing. These relationships may exist using different standards of labeling. For instance: SM could store the relationship that a particular piece of film starting at a specific edge number is equivalent to some video tape at a time code for some number of frames of video (or feet of film). This information is available to clients of the SM for whatever purposes are deemed necessary by the clients. One such client in the system described here is the mfm_handle procedural call in the MFM (See the description of mfm_handle).

The run-time SM database is retrieved at each invocation of the application. Specialized procedures are used for retrieval and reconstruction of the SM database. The design and selection of the content of the information stored as well as the retrieval method itself allow the SM to accommodate changes in the media sources available between application runs and mobility of files describing the edited sequences between systems independent of the media associated with them. The SM not only keeps track of the location of the media files and their sources but also keeps track of varying equivalency relationships between the files and portions of files. Given these properties, the SM functions in such a way as to never require the user to also be knowledgeable of the location of this source specific information that the SM maintains. To avoid the need of storing this information in its own localized place, the SM stores the pertinent pieces of its database in the interested client's disk resident files. At the time of application invocation, as each of these clients accesses or opens the files specific to it, the SM is notified and also reads in the pertinent data to it, stored there at a previous time, or by the SM of another system.

Source Manager Procedural Interface

SM_init

Sm_init is the procedural interface the application uses upon invocation in order to initialize the SM data structures. It is called once at this time and not again for the duration of the running of the application.

Specifically, the call uses the linked list manager to set up data structures to accept records of source names and source identifiers and for storage of any relational information between these existing sources. The actual data for the data structures is accumulated at a later time. No file is read in from disk or elsewhere at this time for initial seeding of the SM's list.

SMReadNTable

SMReadNTable is the procedural interface used by clients of the SM, enabling SM to read in data to be added to its data structures. Clients of SM who had in a previous application run provided SM the chance to include information in a file via use of the sectional file utilities use this call to enable the SM to read in the data and place it in the SM data base.

Specifically, the SM processes the call as follows:

First, the sectional file -handle passed in the call is queried to determine if there is in fact any name information in the file pertinent to the SM. If there is, the length of the data is determined via a call to the sectional file manager and then the information is read into a block of main memory. Once the data is in main memory the data is traversed and processed. For each record of information it is checked to see if the information is already in the SM's database. If it is, it is skipped, if not it is added. This continues until the entire block of information is exhausted. Once this process is complete, the file is checked for the presence of any SM relational information. If any exists, a block of memory is allocated large enough to hold the information and the data read into it. Once in memory, it is traversed and processed. In much the same way as previous, any new information is added to the SM's database and redundant or repeated information is ignored. Once the process is complete, control is returned to the caller, and any memory allocated is returned.

SMOpenTable

SMOpenTable is the preliminary procedural call used by the caller to inform the SM to prepare for building a list of source identifiers. This list of source identifiers will be later used to determine the pertinent information to be written to a sectional file handle.

Specifically, SMOpenTable initializes a linked list to zero and returns an identifier to the list (i.e., the "list identifier") to the caller. This identifier is used in subsequent calls to SMBuildTable as the caller encounters source identifiers to be included in the file it is creating.

SMBuildTable

SMBuildTable is the procedural interface used by the client to indicate the source identifiers for which the pertinent SM information is to be stored in a sectional file manager handle to be indicated later (SMCloseNWriteTable). The client making this call need not be concerned about indicating the same source identifier multiple times. SM will resolve these duplications later when actually writing the file (SMCloseNWriteTable).

Specifically, the procedure uses a source identifier passed in by the client to locate the record in the SM database and make an instantiation of the record in the list being built. The list being built is indicated by an identifier passed into the call. This list identifier was derived from a call to SMOpenTable.

SMCloseNWriteTable

SMCloseNWriteTable is the procedural interface used by the client to indicate to SM that it should use the source identifiers accumulated in all previous calls to SMBuildTable on the specific list identifier, and write the pertinent SM information for those source identifiers to the sectional file manager specified. The procedure determines the unique list of identifiers, all relational information associated with that list and then also includes any new names introduced by the processing and inclusion of any relational information. This secondary inclusion happens only once and does not cause a recursive iteration of the algorithm. The information pertinent is then written to the sectional file manager handle specified, and control returned to the caller. It is the caller's responsibility to close the sectional file manager's handle.

Specifically, the process is as follows:

First, the list of source identifiers is sorted and then traversed. As the traversal ensues, all duplications are eliminated yielding a list of unique records. Also as a product of the traversal, for each unique source identifier processed, the relational information pertinent to that specific source identifier is added to a list of relational information. Once this is completed, the list of relational information is traversed and processed.

As the list of relational information is traversed, two separate operations take place. First, the relational record is written to the sectional file manager handle specified in the call.

Second, any new source identifiers encountered are added to the unique source identifier list. After the relational list is processed, the source identifier list (with source names) is written to the sectional file manager handle. This completes the process for SMCloseNWrite. Control is returned to the caller.

SMRelated

SMRelated is the procedural interface for clients of the SM to obtain information about source relationships (relational information) that SM is managing. This is the primary function of the SM to the other systems in the application. For a given source identifier and range identification on that source, SMRelated will report any other source identifiers and ranges that have equivalent media. For example: Let us assume video tape A has a copy (or clip) of some material from tape B on it, and that copy of material occurs on tape A from time code 2 hours 7 minutes to time code 3 hours 27 minutes and on tape B from time code 4 hours 17 minutes to time code 5 hours 37 minutes. A caller to SMRelated asking for relations to tape B, time code 4 hours 40 minutes for a duration of 20 minutes, (i.e., a portion of the clip) would receive from SMRelated the information that a-duplicate exists on tape A, 2 hours 30 minutes for a duration of 20 minutes.

Specifically the procedure works as follows. The record in the SM's database specified by the source identifier in the call is located. The relational information tagged on that record is.sifted for the ranges specified in the caller's range specification. A list is constructed of all resultant records using the related source identifier and the related range specification. This list is a linked list manager list and the handle to it is returned. Control is returned to the caller. When the application quits via MFM_QUIT, the relations created by SMRelated are written to the MFD 14 on disk by the operation SMCloseNWriteTable which is described above. In this way, the table of relations is preserved in the media database on disk so that its information is easily transported with the media database.

The attached microfiche appendix incorporated herein by reference embodies the MFM and SM modules. The programming language and compiler used are THINK c version 3.01 by Symantec Corporation, and the computer used is the Macintosh II running under Mac OS version 6.0.2.

Portions of the disclosure of this patent document and the accompanying appendix contain material which is subject to copyright protection and for which copyright protection is expressly claimed. The copyright owner has no objection to the facsimile reproduction, e.g., photocopy, by anyone of the patent document as it appears in the Patent and Trademark Office files, but otherwise reserves all copyright rights whatsoever, for example, including but not restricted to the right to load the software on a computer system.

In addition to the advantages already discussed above, the media storage and retrieval system according to the invention accommodates changes and modifications to the source of media and makes equivalent media available to the client of the method without notification to the client. When more complete media becomes available from another source, or when sections of the requested media are absent in the original media channel given, the source of the media can be changed.

The system offers the capability of dynamically linking the client of the media with the media available at the run time of the application. Such links are possibly different with each run of the system, and channels of media may actually change even after the link is established. The flexibility of the media management system in effect frees the user from making the actual selection of source media as well as keeping track of source media equivalencies, without unduly burdening the process of making the basic identifying request.

Figure 2:
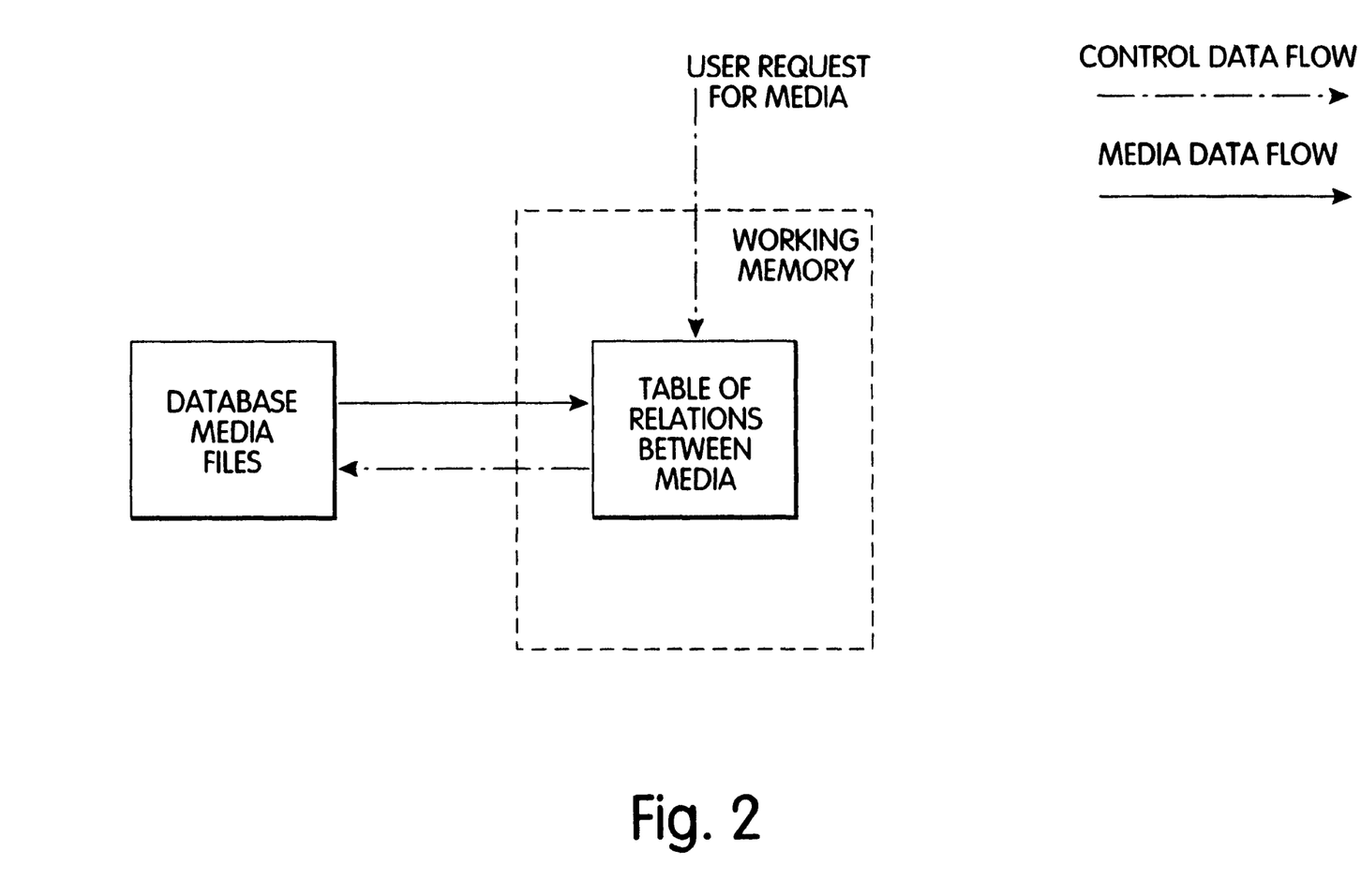
FIG. 2 is a block diagram showing one embodiment of control and media data flow between the media database and a table containing media equivalency relationships.

FIG. 2 describes the digitized media management system according to one aspect of the invention. Data is stored in database media files and these files are read from the storage device into a working memory where a table of relations is built in response to reading the media files. The working memory accepts a user request for media and the requested media file is located in the table of relations. A handle is returned to the located media file and the media files and the table of relations are written from the working memory to the media file database on a storage device.

Other embodiments are within the following claims.

We claim:

1. A computer system for managing storage and retrieval of media data stored in a plurality of media data files, comprising:
   means for representing a sequence of clips of the media data, wherein each clip is defined by an identifier of a source of the media data to be used for the clip; and
   means for dynamically linking one of the plurality of media data files to each clip using the identifier of the media data for the clip when the media data for the clip is accessed.

2. The computer system of claim 1, wherein the identifier of the media data for a clip comprises an indication of a portion of one of the plurality of media data files, and wherein the means for dynamically linking comprises:
   means for receiving a request for a portion of a media data file, wherein the request includes an identifier of the media data file and a range within the media file;
   means for locating the media data file corresponding to the identifier included in the request, and
   means for if the corresponding media file cannot be located, identifying one of the plurality of media files as an equivalent to the requested portion of the media data file.

3. The computer system of claim 2, wherein the means for identifying comprises:
   means for maintaining a table of relations, each relation identifying equivalent media data files using, for each media data file, a unique source identifier that identifies a source for the media data file and a segment of the source; and
   means for locating a media data file using the table of relations having a unique source identifier and a segment corresponding to the requested portion of the media data file.

4. The computer system of claim 1, wherein the media data is motion video data and the identifier of the media data includes a start time and an end time defining a range within the media data file.

5. The computer system of claim 1, further comprising:
   a first means for storing information about physical source media wherein the media data in the plurality of media data files is derived from the physical source media, and wherein each physical source medium has a unique source identifier,
   a second means, separate from the first means for storing, for storing information about the media data files, including information defining ranges of media data files having equivalent media data and an associated unique source identifier;
   whereby the identifier defining each clip is a unique source identifier of one of the physical source media whereby the only connection between each of the plurality of media data files and the physical source of the media data file is the unique source identifier associated with the media data file.

6. A method for managing storage and retrieval of media data stored in a plurality of media data files, comprising the steps of:
   creating a representation for a sequence of clips of the media data, wherein each clip is defined by an identifier of a source of the media data to be used for the clip; and
   dynamically linking one of the plurality of media data files to each clip using the identifier of the media data for the clip when the media data for the clip is accessed.

7. The method of claim 6, wherein the identifier of the media data for a clip comprises an indication of a portion of one of the plurality of media data files, and wherein the step of dynamically linking comprises the steps of:

receiving a request for a portion of a media data file, wherein the request includes an identifier of the media data file and a range within the media file;

locating the media data file corresponding to the identifier included in the request, and if the corresponding media file cannot be located, identifying one of the plurality of media files as an equivalent to the requested portion of the media data file.

8. The method of claim 7, wherein the step of identifying comprises the steps of:

maintaining a table of relations, each relation identifying equivalent media data files using, for each media data file, a unique source identifier that identifies a source for the media data file and a segment of the source; and locating a media data file using the table of relations having a unique source identifier and a segment corresponding to the requested portion of the media data file.

9. The method of claim 6, wherein the media data is motion video data and the identifier of the media data includes a start time and an end time defining a range within the media data file.

10. The method of claim 7, further comprising the steps of:

storing information about physical source media wherein the media data in the plurality of media data files is derived from the physical source media, and wherein each physical source medium has a unique source identifier, storing information about the media data files separate from information about the physical source media and including information defining ranges of media data files having equivalent media data and an associated unique source identifier;

whereby the identifier defining each clip is a unique source identifier of one of the physical source media whereby the only connection between each of the plurality of media data files and the physical source of the media data file is the unique source identifier associated with the media data file.

11. A computer system for managing storage and retrieval of continuous media data stored in a plurality of media data files, comprising:

means for defining a sequence of clips of the media data, wherein each clip is defined by an identifier of a source of the media data to be used for the clip; and means for dynamically linking one of the plurality of media data files to each clip using the identifier of the media data for the clip when the media data for the clip is accessed.

12. The computer system of claim 11, wherein:

the continuous media data includes continuous audio media data.

13. The computer system of claim 11, wherein:

the continuous media data includes continuous motion video media data.

14. The computer system of claim 11, wherein:

the continuous media data includes continuous audio and continuous motion video media data.

15. A method for managing storage and retrieval of continuous media data stored in a plurality of media data files, comprising the steps of:

defining a sequence of clips of the media data, wherein each clip is defined by an identifier of a source of the media data to be used for the clip; and dynamically linking one of the plurality of media data files to each clip using the identifier of the media data for the clip when the media data for the clip is accessed.

16. The method of claim 15, wherein:

the continuous media data includes continuous audio media data.

17. The method of claim 15, wherein:

the continuous media data includes continuous motion video media data.

18. The method of claim 15, wherein:

the continuous media data includes continuous audio and continuous motion video media data.

19. A media management system for managing storage and retrieval of continuous media data stored in a plurality of media data files, comprising:

means for representing a sequence of clips of the media data, each clip being defined by an identifier of a source of media data to be used for the clip;

means for storing a data structure relating identifiers of sources of media data to one or more of the plurality of media data files; and means for dynamically linking a clip identifier to a source of media data by retrieving media data corresponding to the clip identifier from a corresponding media data file at the time the media data is requested, based on the data structure.

20. The media management system of claim 19, wherein:

the continuous media data includes continuous audio media data.

21. The media management system of claim 19, wherein:

the continuous media data includes continuous motion video media data.

22. The media management system of claim 19, wherein:

the continuous media data includes continuous audio and continuous motion video media data.

23. The media management system of claim 19, wherein the identifier of the media data for a clip comprises an indication of a portion of one of the plurality of media data files, and wherein the means for dynamically linking comprises:

means for receiving a request for a portion of a media data file, wherein the request includes an identifier of the media data file and a range within the media file;

means for locating the media data file corresponding to the identifier included in the request, and means for, if the corresponding media file cannot be located, identifying another of the plurality of media files as an equivalent to the requested portion of the media data file.

24. The media management system of claim 23, wherein the means for identifying comprises:

means for maintaining a table of relations, each relation identifying equivalent media data files using, for each media data file, a unique source identifier that identifies a source for the media data file and a range within the source; and means for locating a media data file using the table of relations having a unique source identifier and a range within the source corresponding to the requested portion of the media data file.

25. The media management system of claim 19, wherein the media data comprises motion video data and the identifier of the media data includes a start time and an end time defining a range within the media data file.

26. The media management system of claim 19, further comprising:

first means for storing information about physical source media wherein the media data in the plurality of media data files is derived from the physical source media, and wherein each physical source medium has a unique source identifier, second means, separate from the first means for storing, for storing information about the media data files, including information defining ranges of media data files having equivalent media data and an associated unique source identifier;

wherein the identifier defining each clip is a unique source identifier of one of the physical source media whereby the only connection associated with the media data file linking each of the plurality of media data files and the physical source of the media data file is the unique source identifier.

27. A method for managing storage and retrieval of continuous media data stored in a plurality of media data files, comprising the steps of:

creating a representation of a sequence of clips of the media data, each clip being defined by an identifier of a source of media data to be used for the clip;

maintaining a data structure relating identifiers of sources of media data to one or more of the plurality of media data files; and dynamically linking a clip identifier to a source of media data by retrieving media data corresponding to the clip identifier from a corresponding media data file at the time the media data is requested, based on the data structure.

28. The method of claim 27, wherein:

the continuous media data includes continuous audio media data.

29. The method of claim 27, wherein:

the continuous media data includes continuous motion video media data.

30. The method of claim 27, wherein:

the continuous media data includes continuous audio and continuous motion video media data.

31. The method of claim 27, wherein the identifier of the media data for a clip comprises an indication of a portion of one of the plurality of media data files, and wherein the step of dynamically linking comprises the step of:

receiving a request for a portion of a media data file, wherein the request includes an identifier of the media data file and a range within the media file;

locating the media data file corresponding to the identifier included in the request, and if the corresponding media file cannot be located, identifying one of the plurality of media files as an equivalent to the requested portion of the media data file.

32. The method of claim 31, wherein the step of identifying comprises the steps of:

maintaining a table of relations, each relation identifying equivalent media data files using, for each media data file, a unique source identifier that identifies a source for the media data file and a range within the source; and locating a media data file using a table of relations having a unique source identifier and a range within the source corresponding to the requested portion of the media data file.

33. The method of claim 27, wherein the media data comprises motion video data and the identifier of the media data includes a start time and an end time defining a range within the media data file.

34. The method of claim 27, further comprising the steps of:

storing information about physical source media wherein the media data in the plurality of media data files is derived from the physical source media, and wherein each physical source medium has a unique source identifier, storing information about the media data files separate from information about the physical source media and including information defining ranges of media data files having equivalent media data and an associated unique source identifier;

wherein the identifier defining each clip is a unique source identifier of one of the physical source media whereby the only connection associated with the media data file linking each of the plurality of media data files and the physical source of the media data file is the unique source identifier.

35. A computer system for managing storage and retrieval of digitized media data stored in a plurality of media data files on a computer, comprising:

means for representing a sequence of clips of the digitized media data, wherein each clip is defined by an identifier of a source of media data and a range within the source to be used for the clip;

a data structure relating identifiers of sources of media data to one or more of the plurality of media data files;

means for selecting one of the plurality of media data files for each clip using the identifier of the source of media data for the clip and the data structure before the media data for the clip is to be accessed; and means for accessing and displaying the media data from the selected media data file according to the range defined for the clip.

36. The computer system of claim 35, wherein the data structure includes a table of relations, wherein each relation identifies equivalent media data files using, for each of a plurality of media data files, a unique source identifier that identifies a source for the media data file and a segment of the source.

37. The computer system of claim 35, wherein the media data is motion video data and the range within the source is defined using a start time and an end time.

38. The computer system of claim 35, wherein the data structure comprises:

a first means for storing information about physical source media wherein the media data in each of the plurality of media data files is derived from one of the physical source media, and wherein each physical source medium has a unique source identifier;

a second means, separate from the first means for storing, for storing information about the plurality of media data files, including information defining ranges of the plurality of media data files having equivalent media data and an associated unique source identifier; and wherein the identifier of the source defining each clip is a unique source identifier of one of the physical source media, whereby the only connection between each of the plurality of media data files and the physical source of the media data file is the unique source identifier associated with the media data file.

39. A method for managing storage and retrieval of digitized media data stored in a plurality of media data files on a computer, comprising the steps of:

creating a representation for a sequence of clips of the digitized media data, wherein each clip is defined by an identifier of a source of media data and a range within the source to be used for the clip;

maintaining a data structure relating identifiers of sources of media data to one or more of the plurality of media data files;

selecting one of the plurality of media data files for each clip using the identifier of the source of media data for the clip and the data structure before the media data for the clip is to be accessed; and accessing and displaying the media data from the selected media data file according to the range defined for the clip.

40. The method of claim 39, wherein the data structure includes a table of relations, wherein each relation identifies equivalent media data files using, for each of the plurality of media data files, a unique source identifier that identifies a source for the media data file and a segment of the source.

41. The method of claim 39, wherein the media data is motion video data and the range within the source is defined using a start time and an end time.

42. The method of claim 39, wherein the data structure comprises:

storing information about physical source media wherein the media data in each of the plurality of media data files is derived from one of the physical source media, and wherein each physical source medium has a unique source identifier;

storing information about the plurality of media data files separate from information about the physical source media and including information defining ranges of the plurality of media data files having equivalent media data and an associated unique source identifier; and wherein the identifier of the source defining each clip is a unique source identifier of one of the physical source media, whereby the only connection between each of the plurality of media data files and the physical source of the media data file is the unique source identifier associated with the media data file.

* * * * *